(12) United States Patent
Shibazaki et al.

(10) Patent No.: US 6,379,049 B1
(45) Date of Patent: Apr. 30, 2002

(54) ROLLING BEARING

(75) Inventors: Kenichi Shibazaki; Tetsu Takehara; Shinichi Natsumeda; Shoji Noguchi, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/617,921

(22) Filed: Jul. 17, 2000

(30) Foreign Application Priority Data

Jul. 16, 1999 (JP) .......................................... 11-203647

(51) Int. Cl.[7] ............................ F16C 19/00; F16C 33/58
(52) U.S. Cl. ........................ 384/450; 384/564; 384/571
(58) Field of Search ................................. 384/571, 450, 384/564

(56) References Cited

U.S. PATENT DOCUMENTS

| | | | | |
|---|---|---|---|---|
| 1,784,914 A | * | 12/1930 | Strickland et al. | 384/571 |
| 1,992,682 A | * | 2/1935 | Walters | 384/571 |
| 5,921,685 A | * | 7/1999 | Ishimaru et al. | 384/571 |
| 6,033,123 A | * | 3/2000 | Sato et al. | 384/571 |
| 6,086,262 A | * | 7/2000 | Matsumoto | 384/571 |

FOREIGN PATENT DOCUMENTS

JP    11-190333    7/1999    ........... F16C/19/34

* cited by examiner

*Primary Examiner*—Paul N. Dickson
*Assistant Examiner*—Robert A. Siconolfi
(74) *Attorney, Agent, or Firm*—Sughrue Mion, PLLC

(57) ABSTRACT

In the roller bearing, between an outer ring (1) and an inner ring (2), there are interposed a plurality of tapered rollers (3) in a freely rollable manner. A flange portion (4) is formed in the side portion of the inner ring (2). The undercut allowance ratios of a contact ellipse formed due to mutual contact between the flange portion (4) and the end face of the roller (3) is set in the range of $-0.6 \leq (h-b-c)/b \leq 2$, where a grinding undercut dimension on the flange portion (4) is expressed as c, a contact point height between the flange portion (4) and the end face of the roller (3) is expressed as h, and the minor radius of a contact ellipse formed due to contact between the flange portion (4) and the end face of the roller (3) is expressed as b.

9 Claims, 14 Drawing Sheets

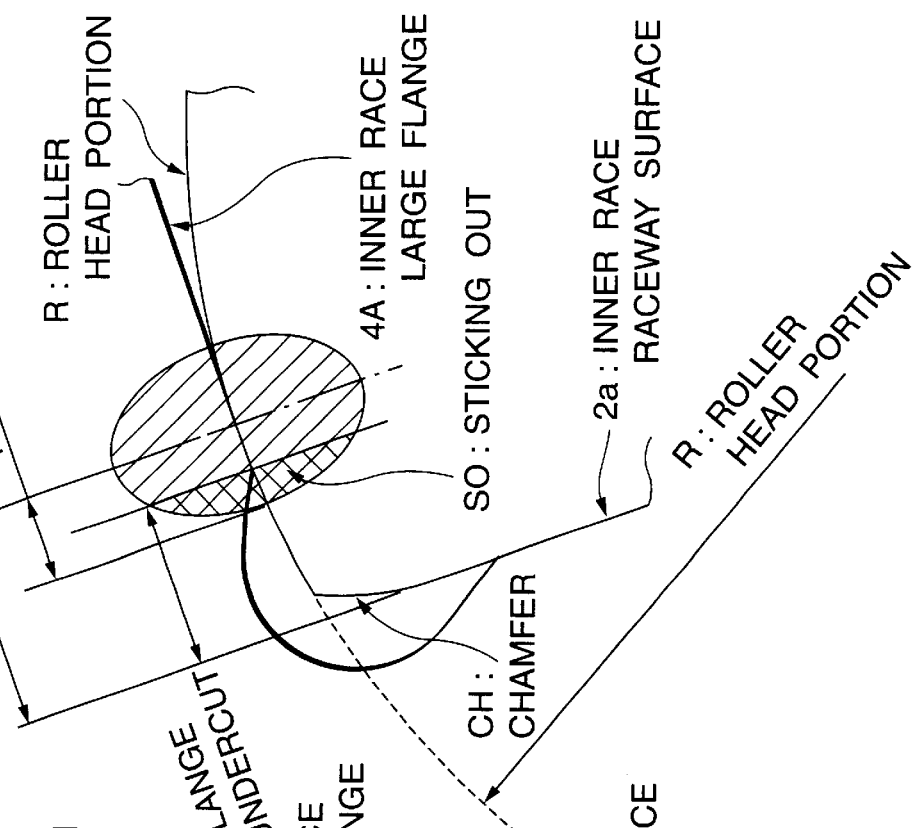
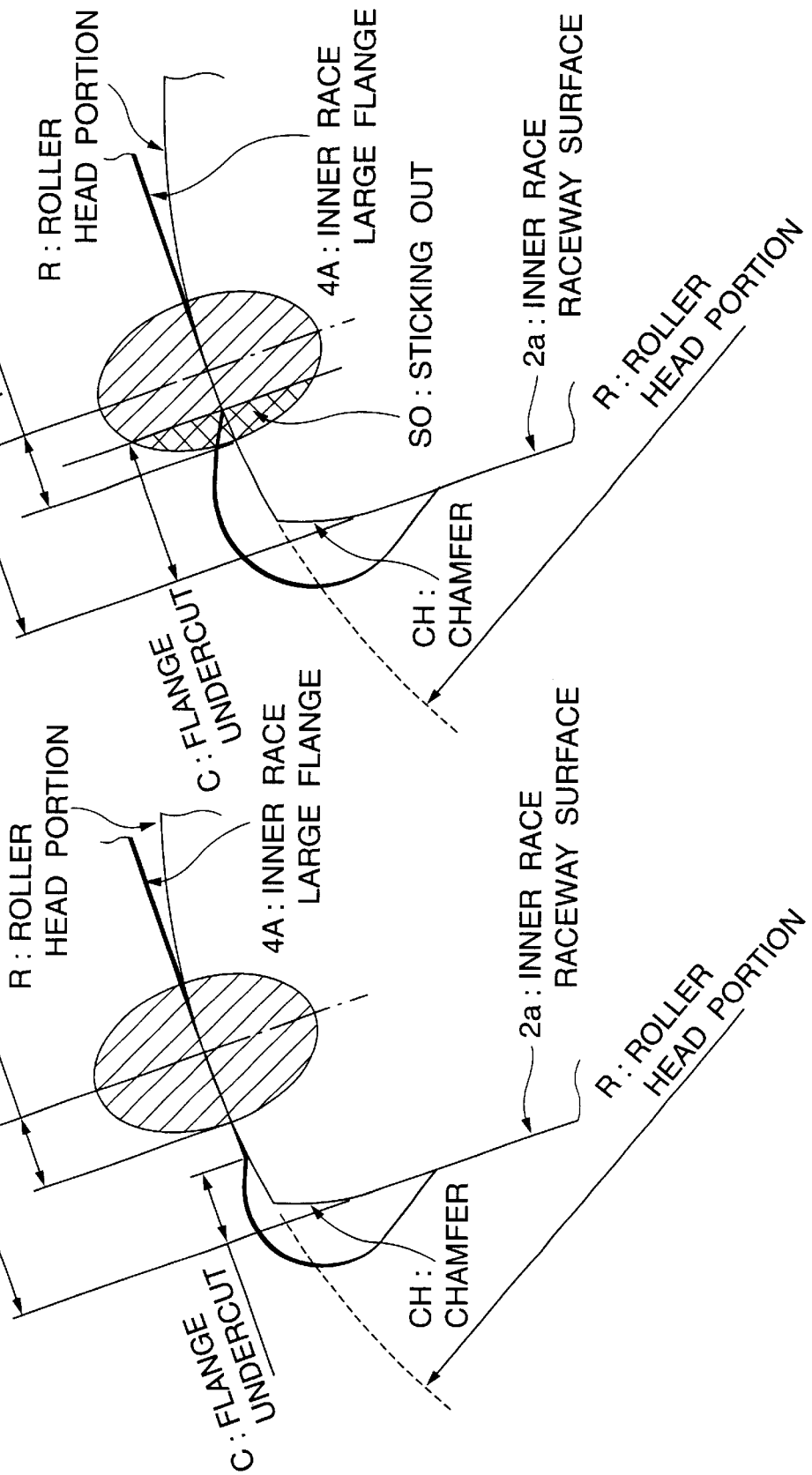

ROLLING BEARING

BACKGROUND OF THE INVENTION

The present invention relates to a roller bearing which, by obtaining the optimum range of the undercut dimension of a flange portion of the roller bearing, not only can enhance the performance of the roller bearing such as seizure resistant property and low torque property but also enhances the workability of undercut grooves formed in the flange portion of the roller bearing to thereby be able to reduce the cost of the roller bearing.

In a tapered roller bearing, as shown in FIG. 1, between an outer ring 1 and an inner ring 2, there is rollably interposed a tapered roller 3 and, in the side portion of the inner ring 2, there is formed a flange portion 4 with which the end face of the tapered roller 3 can be contacted.

An axial load acting on the tapered roller bearing is supported mainly by the flange portion 4 and the end face of the tapered roller 3. Also, in the contact portion between the flange portion 4 and the end face of the tapered roller 3, there is formed a contact ellipse which can be calculated according to a Hertz contact theory. The contact ellipse varies according to the geometrical shapes of the flange portion 4 and the end face of the tapered roller 3 and a flange load acting on the flange portion 4.

Since the mutual contact between the flange portion 4 and the end face of the tapered roller 3 is rolling contact involving large sliding, when the quantity of lubricating oil to be supplied to the bearing is small, an oil film is hard to be produced between the flange portion 4 and the end face of the tapered roller 3, which raises a fear that friction and seizure can occur. Also, due to the fact that the present mutual contact involves sliding contact, great importance is attached to the low torque property of the bearing.

By the way, when grinding the raceway surfaces of the inner and outer rings 1, 2 as well as the flange portion 4, in order to prevent a grindstone from touching the boundary portion between the flange portion 4 and raceway surfaces, in the boundary portion, there is formed a undercut groove 5. However, there is a fear that such undercut groove 5 can have a serious influence on the seizure resistant property and low torque property of the bearing. That is, in case where the contact point between the flange portion 4 and the end face of the tapered roller 3 interferes with the undercut groove 5 and part of the contact ellipse formed due to mutual contact between the flange portion 4 and the end face of the tapered roller 3 is thereby caused to stick out into the undercut groove 5, in the vicinity of the boundary portion between them, there is produced an edge load. And, there is also a possibility that the edge load can have a value larger than the Hertz contact surface pressure obtained when part of the contact ellipse does not stick out into the undercut groove 5, which lowers the above-mentioned seizure resistant property and low torque property of the bearing.

In view of the above facts, conventionally, the undercut dimension c (FIG. 1) of the undercut groove 5 is controlled down to a sufficiently small value to thereby prevent the contact ellipse from interfering with the undercut groove 5, whereby the production of the edge load is avoided to thereby be able to prevent the lowered seizure resistant property and low torque property of the bearing.

However, it is very difficult to work the undercut grooves 4 in such a manner that the undercut dimension c is small for the following reasons: That is, a. the size of a cutting tool for forming the undercut groove 5 of the flange portion 4 cannot be reduced so much because the strength and rigidity of the cutting tool must be secured;

b. it is necessary to secure the oscillation width of a grindstone;

c. when grinding the raceway surfaces of the inner and outer rings 1, 2 as well as the flange portion 4, it is necessary to prevent poor grinding such as unground portions and high edge portions due to unground;

d. it is necessary to allow variations in the finishing dimensions of the respective portions;

e. there is a limitation in a specially control for the working dimensions, because the production cycle and cost of the bearing are taken into account; and, f. it is necessary to prevent the grindstone from being slackened due to thermal treatment deformation.

Especially, in a small-diameter bearing for use in a car, since the contact point height (in FIG. 1, h) between the flange portion 4 and the end face of the tapered roller 3 is close to the undercut dimension c in value, it is still further difficult to reduce the undercut dimension c.

For the above reasons, there h as been a demand that, without lowering the seizure resistant property and low torque property of the bearing, the undercut dimension c is set large to a certain degree to thereby facilitate the working of the undercut groove 4 so as to enhance the workability of the undercut groove 4 as well as reduce the cost of the roller bearing.

SUMMARY OF THE INVENTION

The present invention aims at eliminating the drawbacks found in the above-mentioned conventional roller bearings. Accordingly, it is an object of the invention to provide a roller bearing which, by obtaining the optimum range of the undercut dimension of a flange portion of the roller bearing, not only can enhance the performance of the roller bearing such as the seizure resistant property and low torque proper thereof but also enhances the workability of the undercut groove formed in the flange portion of the roller bearing to thereby reduce the cost of the roller bearing.

The above object can be attained by a roller bearing, according to the invention, which is structured such that between an outer ring and an inner ring, there are interposed a plurality of tapered rollers in a freely rollable manner, and a flange portion is formed in the side portion of the outer ring or inner ring, wherein the undercut allowance ratios of a contact ellipse formed due to contact between the flange portion and the end face of the roller are set in the range of $-0.6 \leq (h-b-c)/b \leq 2$, where $(h-b-c)/b$ denotes the undercut allowance ratio, a grinding undercut dimension on the flange portion side is expressed as c, a contact point height between the flange portion and the end face of the roller is expressed as h, and the minor radius of a contact ellipse formed due to contact between the flange portion and the end face of the roller is expressed as b.

According to the invention, because the undercut allowance ratios of the contact ellipse are set in the above-mentioned range and also because there is obtained the optimum range of the undercut dimension of the flange portion, the undercut dimension of the flange portion can be increased to a certain degree without lowering the seizure resistant property or low torque property of the bearing. That is, by optimizing the undercut dimension in this manner, not only the performance of the bearing can be enhanced but also the workability of the undercut groove of the flange portion is enhanced to thereby be able to reduce the cost of the bearing.

BRIEF DESCRIPTION OF THE DRAWINGS

FIG. 3A is a typical view of a state in which a contact ellipse does not interfere with a flange undercut (undercut dimension c), and FIG. 3B is a typical view of a state in which the contact ellipse interferes with the flange undercut (undercut dimension c);

DETAILED DESCRIPTION OF THE PREFERRED EMBODIMENTS

Now, description will be given below of a roller bearing according to the preferred embodiments according to the invention with reference to the accompanying drawings.

(First Embodiment According to the Invention)

Figure 1:
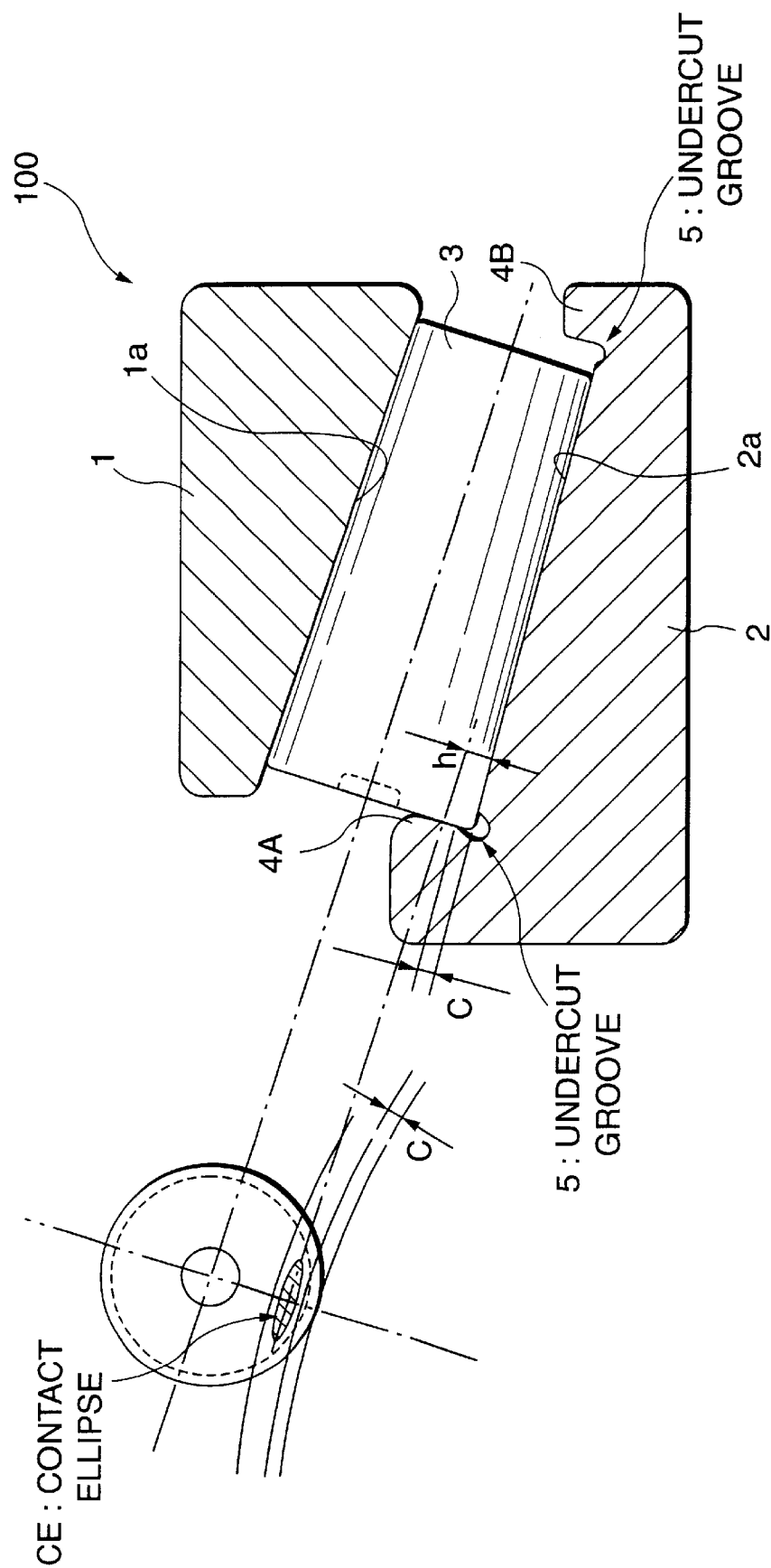
FIG. 1 is a typical section view of a state of contact between the roller and flange portion of a tapered roller bearing.
Figure 2:
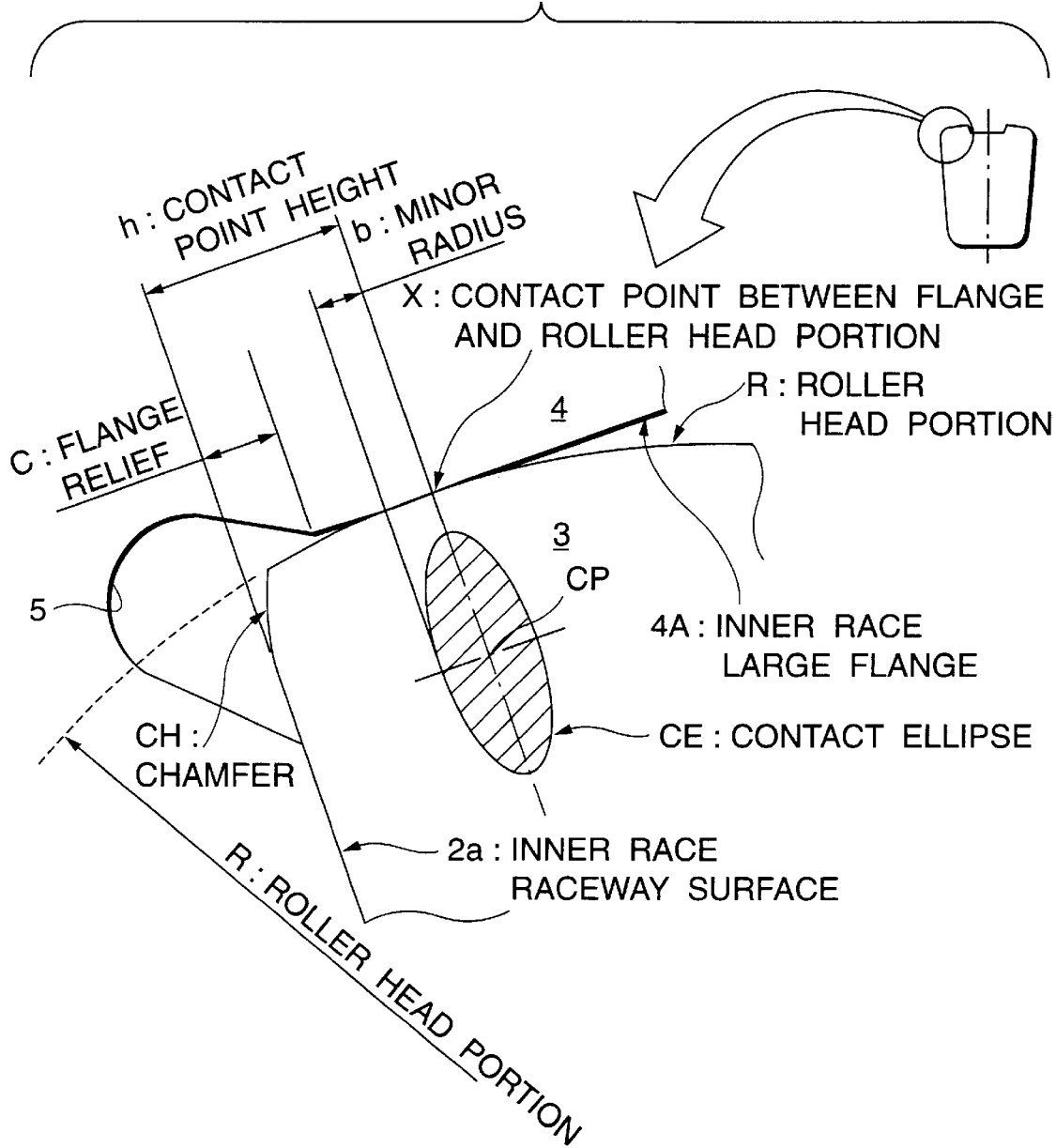
FIG. 2 is a typical, enlarged view of a state of contact between the roller and flange portion of a tapered roller bearing.

In a first embodiment according to the present invention, as shown in FIG. 2, the roller bearing 100 comprises an inner ring 2 having a raceway surface 2a, an outer ring 1 having a raceway surface 1a, and a plurality of roller 3 rotatably interposed between the raceway surfaces of the inner and outer rings 2 and 1. The roller 3 has a chamfer CH at a corner thereof. The inner ring 2 has flange portions 4A and 4B at its both side portions between which the raceway surface 2a is interposed in an axial direction of the roller bearing 100. A grinding undercut 5 is formed between the flange portion 4A and the raceway surface 2a, and a contact ellipse CE is defined by mutual contact between the flange portion 4A and the end face of the roller.

In addition, in the first embodiment according to the invention, as shown in FIG. 2, where the grinding undercut dimension (mm) (which is hereinafter referred to as a undercut dimension or a flange undercut) on the flange portion 4 side is expressed as c, the contact point height (mm) (which is hereinafter referred to as a contact point height) between the flange portion 4 and the end face of the roller 3 is expressed as h, and the minor radius (mm) (which is hereinafter referred to as the ellipse minor radius) of a contact ellipse formed due to mutual contact between the flange portion 4 and the end face of the roller 3, which can be calculated according to the Hertz elastic contact theory, is expressed as b, (h-b-c)/b, that is, the undercut allowance ratio of the contact ellipse formed due to the mutual contact between the flange portion 4 and the end face of the roller 3 is set in the range of $-0.6 \leq (h-b-c)/b \leq 2$, preferably, in the range of $-0.6 \leq (h-b-c)/b \leq 1$, more preferably, in the range of $-0.6 \leq (h-b-c)/b \leq 0$.

Here, the ellipse minor radius b is to be defined by the following equations. By the way, the source of the following equations (1)–(7) is Ball Bearing Lubrication (Written by Hamrock & Dowson, Pages 54–76, and published by John Wiley, 1981, 1st edition), and the source of the following equations (8)–(14) is Rolling Bearing Engineering (Edited by Rolling Bearing Engineering Editing Committee, Pages 193–195, and Published by Yoken Do, 1975, 1st edition).

$$b = \left(\frac{6\varepsilon FR}{\pi k E'}\right)^3 \quad (1)$$

Figure 11:
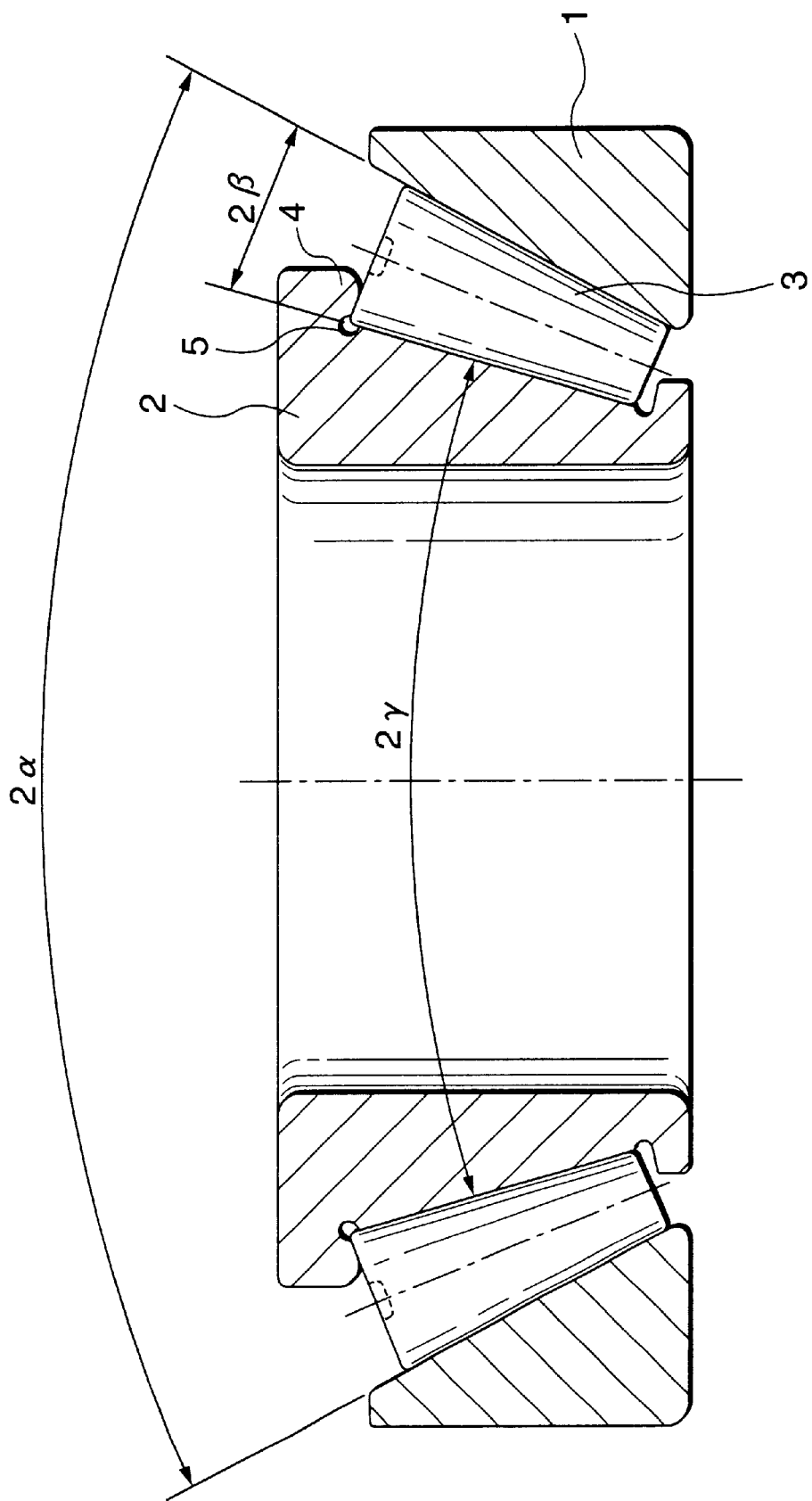
FIG. 11 is a typical section view of the angles of the inner ring, outer ring and roller of a tapered roller bearing.
Figure 12:
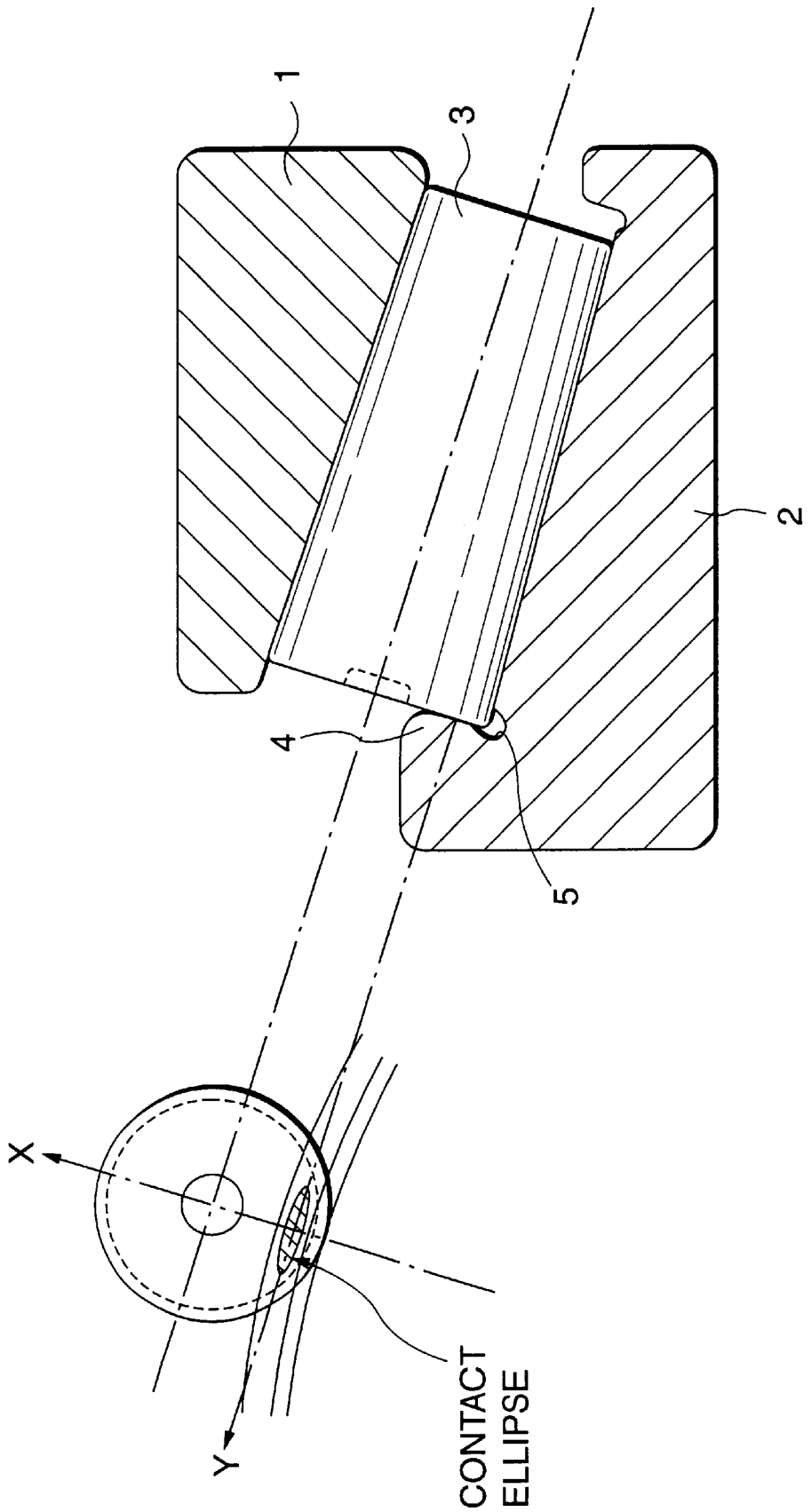
FIG. 12 is a typical section view of a tapered roller bearing.

Here, $$\varepsilon = 1.0003 + \frac{0.5968}{R_y/R_x} \quad (2)$$

$$k = 1.0339\left(\frac{R_y}{R_x}\right)^{0.6360} \quad (3)$$

$$E' = \frac{2}{\frac{1-v_a^2}{E_a} + \frac{1-v_b^2}{E_b}} \quad (4)$$

$$\frac{1}{R} = \frac{1}{R_x} + \frac{1}{R_y} \quad (5)$$

$$\frac{1}{R_x} = \frac{1}{r_{ax}} + \frac{1}{r_b} \quad (6)$$

$$\frac{1}{R_y} = \frac{1}{r_{ay}} + \frac{1}{r_b} \quad (7)$$

$$F = \frac{\sin(2\beta)}{\sin\alpha} \frac{F_a}{z} \quad (8)$$

$$F_a = \frac{0.25 C_{ar}}{Y} \quad (9)$$

$$y = 0.4 \cot\alpha \quad (10)$$

$$C_{or} = f_0 i z L_{we} D_{we} \cos\alpha \quad (11)$$

$$f_0 = 44\left(1 - \frac{D_{we}\cos\alpha}{D_{pw}}\right) \quad (12)$$

$$D_{pw} = (2R_a - L_w)\sin(\alpha - \beta) \quad (13)$$

$$L_{we} = L_w - (r_1 + r_2) \quad (14)$$

where, $r_{ax}$: the radius of curvature of the contact portion between the flange and roller in the flange radial direction (in FIG. 12, in the X direction) (normally, $\infty$) (mm);

$r_{ay}$: the radius of curvature of the contact portion between the flange and roller in the flange circumferential direction (in FIG. 12, in the Y direction) (normally, a negative value) (mm);

$r_b$: Roller head portion R (mm);
α: Outer ring cup angle (see FIG. 11);
β: Roller conical angle (see FIG. 11);
Z: Number of rollers per row;
$E_a$: Modulus of longitudinal elasticity (MPa) of flange;
$E_b$: Modulus of longitudinal elasticity (MPa) of roller;
$V_a$: Poisson's ratio of flange;
$V_b$: Poisson's ratio of roller;
$D_{we}$: Diameter of center of roller length (mm);
$L_w$: Whole length of roller (mm);
$r_1$: Roller large end side chamfer dimension (mm);
$r_2$: Roller small end side chamfer dimension (mm);
$R_a$: Roller reference head portion spherical surface radius;
i: Number of rows of rolling bodies within bearing.

Now, description will be given below of the undercut allowance ratio when taking the case of a tapered roller bearing. As shown in FIGS. 3A and 3B, the parameter (h-b-c) shows the state of the interference of the contact ellipse with the flange undercut (undercut dimension c). The state of contact between the contact ellipse and the flange undercut can be known depending on whether this parameter, namely, (h-b-c) is positive or negative. That is:

(a) where (h-b-c)>0, the contact ellipse does not interfere with the flange undercut (a state shown in 3A).
(b) where (h-b-c)<0, part of the contact ellipse interferes with the flange undercut, (an sticking out portion SO in a state shown in 3B).

A value obtained by dividing the above parameter by the contact ellipse minor radius b, as described above, is the undercut allowance ratio of the contact ellipse. This undercut allowance ratio is a value expressed by a ratio of the interference state between the ellipse and flange undercut to the contact ellipse minor radius, and also the undercut allowance ratio is a typical parameter of the interference state.

Here,
(a) where (h-b-c)/b>0, the contact ellipse does not interfere with the flange undercut (a state shown in 3A).
(b) where (h-b-c)/b=0, the end of the contact ellipse and the edge of the flange undercut agree with each other.
(c) where (h-b-c)/b<0, the contact ellipse interferes with the flange undercut and part of the contact ellipse sticks into the flange undercut (a state shown in 3B).

Here, b is a value which varies according to a load, and the undercut allowance ratio (h-b-c)/b also varies according to a load. As b increases, that is, the larger the load is, the larger the flange undercut (undercut dimension c) is, the more closely the flange undercut (undercut dimension c) and the contact ellipse approach each other, so that the state of their mutual interference becomes severer accordingly.

Also, when the load can be specified, b may be used because b can be calculated from the specified load. However, when the load condition is unknown, in case where the undercut allowance ratio is evaluated by the maximum value of b, the severest state can be expressed and, therefore, this way of expression is convenient. Thus, when the general application of the roller bearing according to the present embodiment according to the invention was checked for its operation load condition, it has been found that, in many cases, the operation load condition is equal to or less than 25% of $C_{or}$ (the basic static load rating of the bearing). From this, the maximum value of the load may be set 25% of $C_{or}$ and, therefore, the contact ellipse minor radius b, as described above, can be found using the above-mentioned equations (1)–(14) including the equation (9).

As described above, even when the load condition is unknown, by using the above-mentioned equations (1)–(14), the undercut allowance ratio can be easily calculated according to the internal factors of the roller bearing. That is, by measuring the internal dimensions of the components of the bearing, the undercut allowance ratio can be calculated.

In the present embodiment according to the invention, bearings different in the flange undercut (undercut dimension c) and bearings different in the contact point height h were made experimentally, and evaluation tests were conducted on the bearings for the performance of the bearings that is, the seizure resistant property and dynamic torque thereof while varying the undercut allowance ratio (h-b-c)/b variously. By checking the range of (h-b-c)/b in accordance with the results of the evaluation tests, the above-mentioned optimum range was found. The details of this will be explained in the chapter of an embodiment which will be discussed later herein.

(Second Embodiment According to the Invention)

In a tapered roller bearing and a cylindrical roller bearing, the contact between the flange portion and the end face of a roller is sliding contact involving large sliding, in which friction and wear are large when compared with rolling friction; and, therefore, in case where lubrication oil is short, in the roller bearing, there can incur inconveniences such as seizure, that is, melting and adhesion can occur in and from the contact portion between the flange portion and the end face of the roller.

As measures to avoid such seizure occurrence, in Japanese Patent Unexamined Publication No. Hei. 9-250547 and Japanese Patent Unexamined Publication No. Hei. 10-89352, there is disclosed a method in which the flow of lubricating oil within the bearing is changed to thereby be able to supply a large quantity of lubricating oil to the flange portion; in Japanese Patent Unexamined Publication No. Hei. 7-91452 and Japanese Patent Unexamined Publication No. Hei. 7-103243, there is disclosed a method in which the surface shapes of the flange portion and roller end face are improved; in Japanese Patent Unexamined Publication No. Hei. 9-177774 and Japanese Patent Unexamined Publication No. Hei. 9-287616, there is disclosed a method in which the quality of the surfaces of the flange portion and roller end face is changed using a membrane; in Japanese Patent Unexamined Publication No. Hei. 8-135666 and Japanese Patent Unexamined Publication No. Hei. 9-32859, there is disclosed a method in which, in the vicinity of the bearing, there is disposed an oil reservoir for storing lubricating oil temporarily; and, in Japanese Patent Unexamined Publication No. Hei. 8-210472 and Japanese Patent Unexamined Publication No. Hei. 9-105450, there is disclosed a method in which, in order to be able to store lubricating oil temporarily within the bearing, there is disposed a shield plate on the end face of the bearing.

However, the measures against seizure disclosed in these patent publications are not always sufficient and thus there still exists the need to enhance further the seizure resistant property of the bearing.

Accordingly, in the second embodiment according to the invention, generally speaking, in the rings of the cylindrical roller bearing and cylindrical roller bearing including flange portions, in each of the undercut grooves for grinding formed between the raceway surfaces and flange portions, there are formed a plurality of minute holes extending in the radial direction of the undercut groove; or, by filling oil-containing porous material or resin into these minute holes, lubricating oil is stored in these minute holes and, in the case of short lubricating oil, the thus stored lubricating oil is percolated from the minute holes to the undercut grooves due to a centrifugal force, thereby preventing the seizure of the undercut grooves and thus enhancing the seizure resistant property of the bearing.

Figure 13:
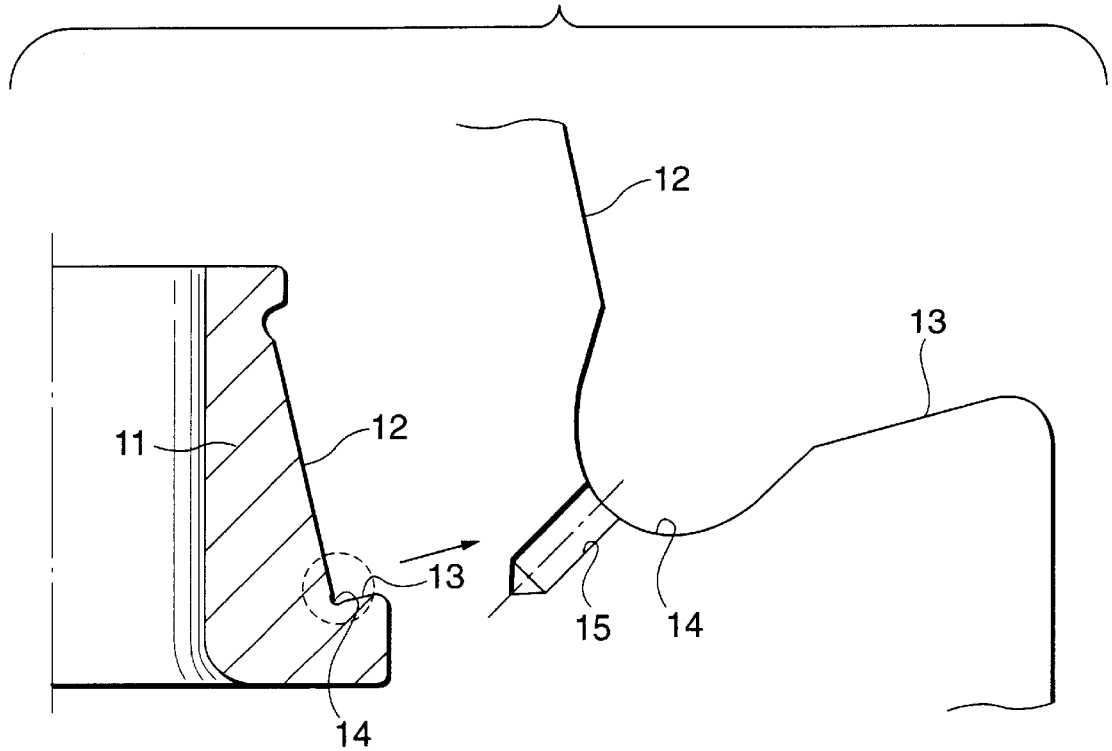
FIG. 13 is a section view of a roller bearing according to a second embodiment according to the invention, and an enlarged view of the main portions of the roller bearing; and, FIG. 14 is a section view of a roller bearing according to a modification of the second embodiment according to the invention, and an enlarged view of the main portions of the roller bearing.

Specifically, as shown in FIG. 13, in the tapered roller bearing, in a undercut groove 14 for grinding formed between the raceway surface 12 of an inner ring 11 and a flange portion 13, there are formed a plurality of minute holes 15 extending in the radial direction of the undercut groove 14. That is, lubricating oil is stored in the minute hole 15 and, in the case of short lubricating oil, the thus stored lubricating oil is percolated from the minute hole 15 to the undercut groove 14 due to a centrifugal force to thereby prevent the seizure of the undercut groove 14. In this manner, since the lubricating oil is stored in the minute hole 15, it is possible to secure the seizure resistant property of the bearing for a long time. By the way, the larger the diameter, depth and number of the minute holes are, the higher the effect is, within the range where they do not have practical influences on the strength of the flange portion 13.

Figure 14:
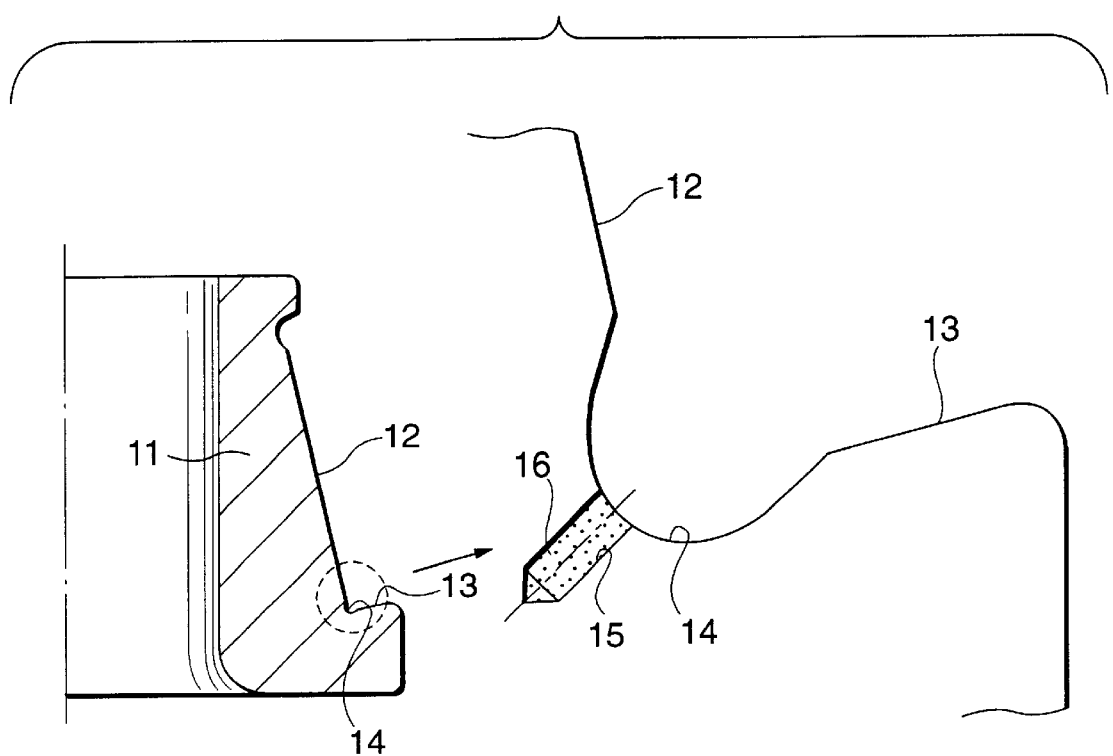

Also, as shown in FIG. 14, in the tapered roller bearing, in a undercut groove 14 for grinding formed between the raceway surface 12 of an inner ring 11 and a flange portion 13, there are formed a plurality of minute holes 15 extending in the radial direction of the undercut groove 14, and the minute hole 15 is filled with oil containing porous material 16 (or resin). In this case as well, in the case of short lubricating oil, the lubricating oil is percolated from the porous material 16 (or resin) filled into the minute hole 15 to the undercut groove 14 due to a centrifugal force to thereby prevent the seizure of the undercut groove 14. And, in this case, when compared with the case shown in FIG. 13, the lubricating oil can be stored for a longer time and, therefore, it is possible to secure the seizure resistant property of the bearing for a longer time.

By the way, in the cylindrical roller bearing as well, in case where the present invention is applied to the undercut groove of the rotary race thereof, there can be obtained the same effect. Of course, in case where the flange portions can be worked in such a manner that they can have large undercut, formation of these minute holes can be facilitated.

Example

Now, description will be given below of an example of a roller bearing according to the first embodiment according to the invention.

(1) Evaluation on Seizure Resistant Property

Figure 9:
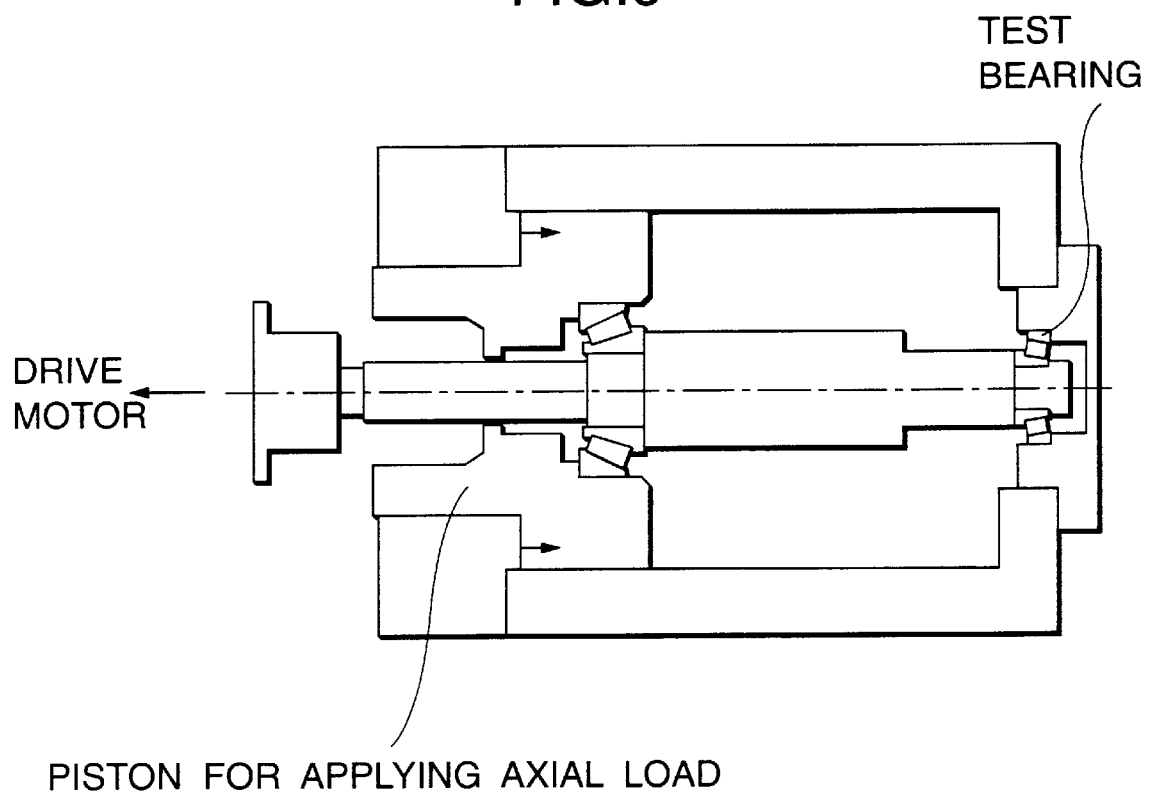
FIG. 9 is a typical view of a seizure test apparatus.

Tapered roller bearings different in the flange undercut (undercut dimension c) were made experimentally and were evaluated on the seizure resistant properties thereof. The dimensions of the experimentally made tapered roller bearings or test bearings are as follows: that is, an inside diameter is 30 mm; an outside diameter is 70 mm; and a basic static load rating $C_{or}$=5700 kgf. An evaluation test on the seizure resistant properties of the test bearings was conducted by using a test apparatus shown in FIG. 9 in such a manner that each test bearing was incorporated into the test bearing portion of the test apparatus and supply of lubricating oil was cut off from the circulatory supply of the lubricating oil. The seizure resistant property of the bearing was evaluated on the basis of the time required from the oil supply cutoff to the occurrence of the seizure of the test bearing as the result of a sudden increase in the dynamic torque of the test bearing (seizure time). The lubricating conditions in the circulatory oil supply time were such that the quantity of supply of the lubricating oil was 1000 ml/min. and the temperature of the lubricating oil was 50° C. And, the evaluation test was conducted under the conditions of a constant axial load and a constant rotation number.

Figure 4:
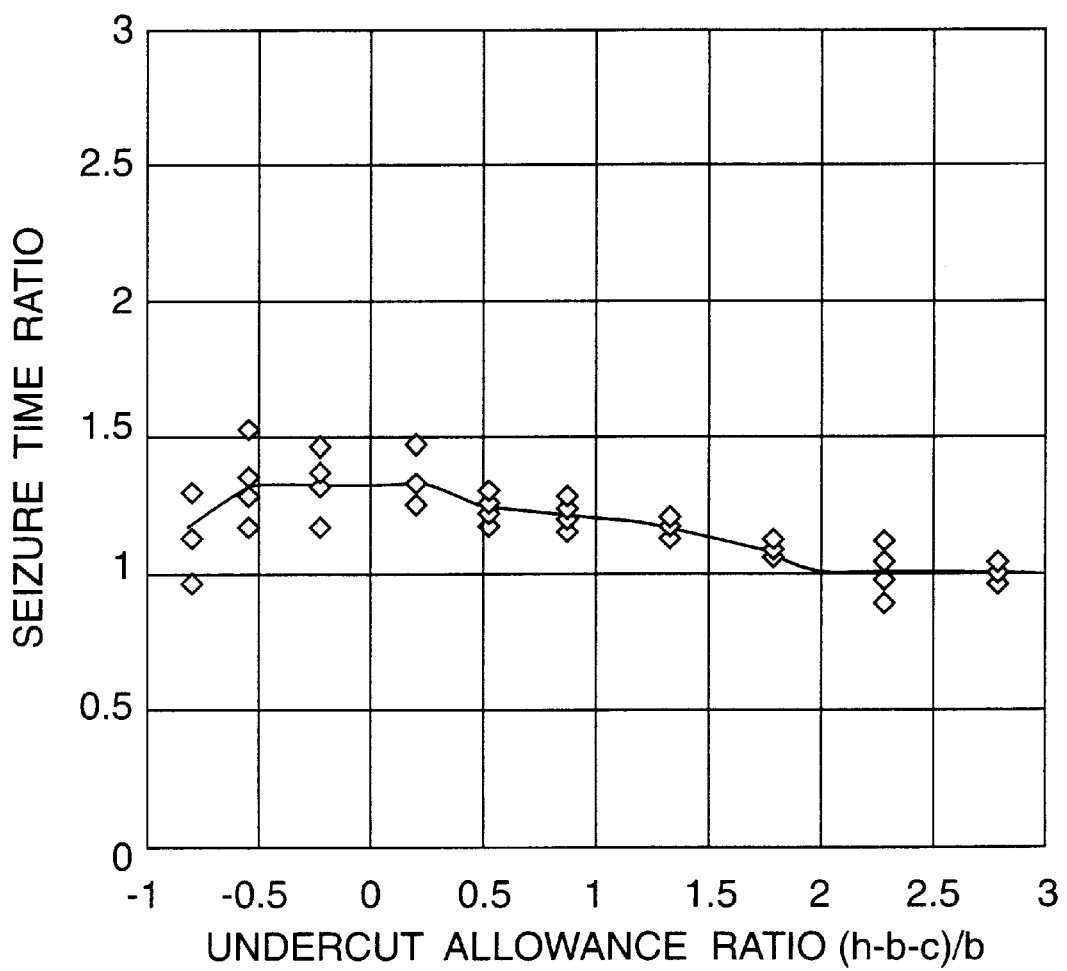
FIG. 4 is a graphical representation of the results of a seizure test conducted on bearings.

The results of the seizure test are shown in FIG. 4. In FIG. 4, the horizontal axis shows the undercut allowance ratios (h-b-c)/b and the vertical axis shows the values that are obtained by dividing the seizure times by the mean seizure time of the bearings each having a contact state of (h-b-c)/b>2. The reason why the bearings each having a contact state of (h-b-c)/b>2 were selected as the standard for calculation of the seizure time ratios is that, since, in the conventional bearings, the undercut dimensions c were set small in order to avoid the occurrence of an edge load, most of the conventional bearings had a contact state of (h-b-c)/b>2.

From FIG. 4, it can be seen that, even when (h-b-c)/b is negative, that is, even when the contact ellipse interferes with the flange undercut, in case where (h-b-c)/b is up to −0.6 or so, the seizure resistant property is not lowered but is rather enhanced. The reason for this can be assumed that, when the contact ellipse interferes with the flange undercut, the lubricating oil stored in the flange undercut is easy to flow into the contact surface to thereby facilitate the lubrication of the contact point CP; and, therefore, in spite of the fact that the contact ellipse interferes with the flange undercut to thereby produce an edge load and thus raise the surface pressure a little, the seizure resistant property of the bearing can be prevented from lowering. Conventionally, it has been believed that, in case where the contact ellipse interferes with the flange undercut, there is produced the edge load in the flange undercut, and the thus produced edge load makes it easy to cause seizure in the flange undercut; and, therefore, the flange undercut has been worked so as to have a sufficiently small undercut dimension c, in spite of the fact that such working is difficult. However, from the results of the present seizure test, it has been found that, actually, even when the contact ellipse interferes with the flange undercut to a certain degree, the seizure resistant property is not lowered but is rather enhanced. That is, it has been found that, so far as the seizure resistant property is concerned, the undercut dimension c can be increased over the conventional one.

Further, from FIG. 4, it has been found that, when the undercut allowance ratio is in a positive range as well, in case where the undercut allowance ratio is in the range of 2 or less which is smaller than that of the conventional bearing, the seizure resistant property of the bearing is enhanced. The reason for this is presumed that, as the contact ellipse approaches the flange undercut, the lubricating oil stored in the flange undercut is made easier to flow into the contact surface, thereby being able to enhancing the lubricating property of the contact point.

(2) Bearing Torque Measurement Test

Figure 10:
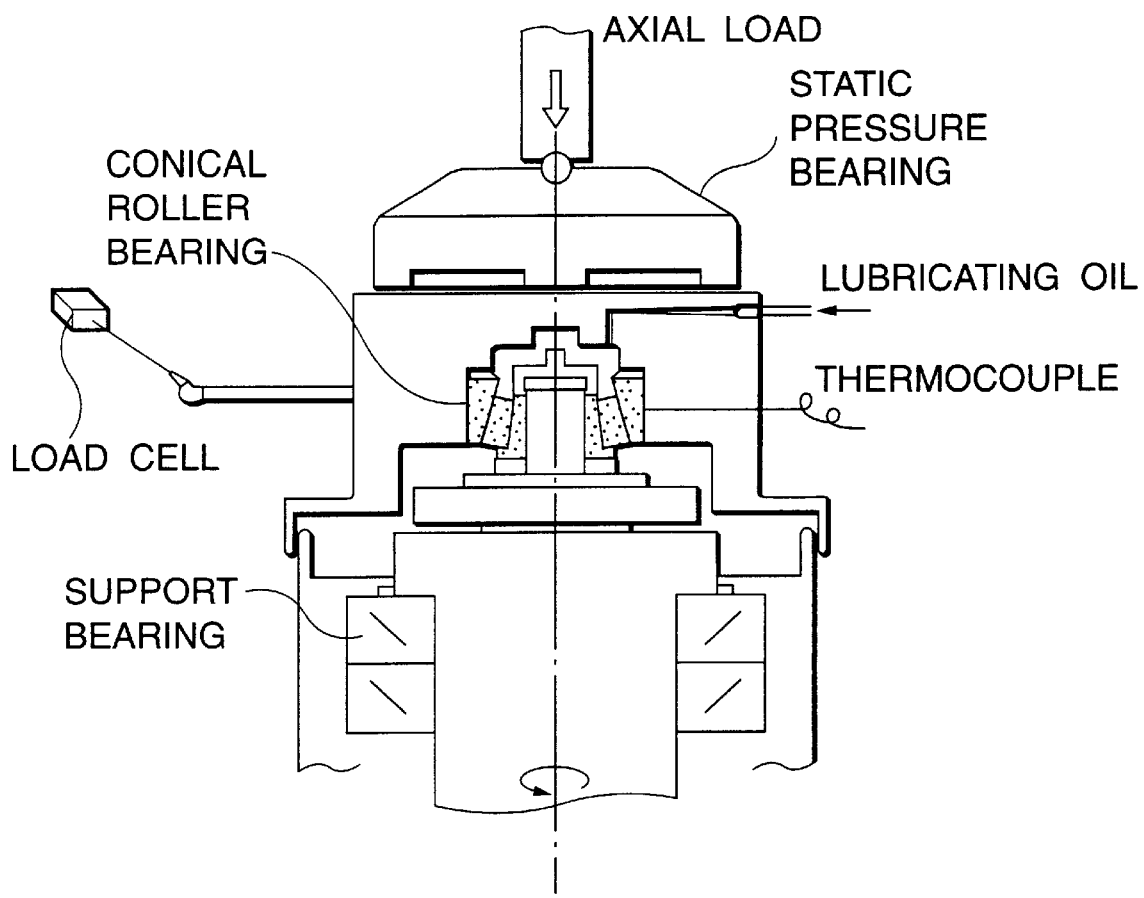
FIG. 10 is a typical view of a bearing torque test apparatus.

Next, similarly to the above-mentioned (1) seizure resistant property evaluation test, using tapered roller bearings differing in the flange undercut (undercut dimension c), a bearing torque evaluation was made. Further, in tapered roller bearings differing in the contact point height h as well, a bearing torque evaluation was made. Specifically, using a test apparatus shown in FIG. 10, the bearing torque was measured in the following manner: that is, the test bearing was incorporated into the test bearing portion of the test apparatus and the bearing torque was measured under the conditions of circulatory oil supply at a temperature of 50° C. and in a quantity of 500 ml/min., constant axial loads ($F_a/C_{or}$=0.035, 0.106, 0.179), and constant rotation number. Lubricating oil used here is the same as in the seizure test.

Figure 5:
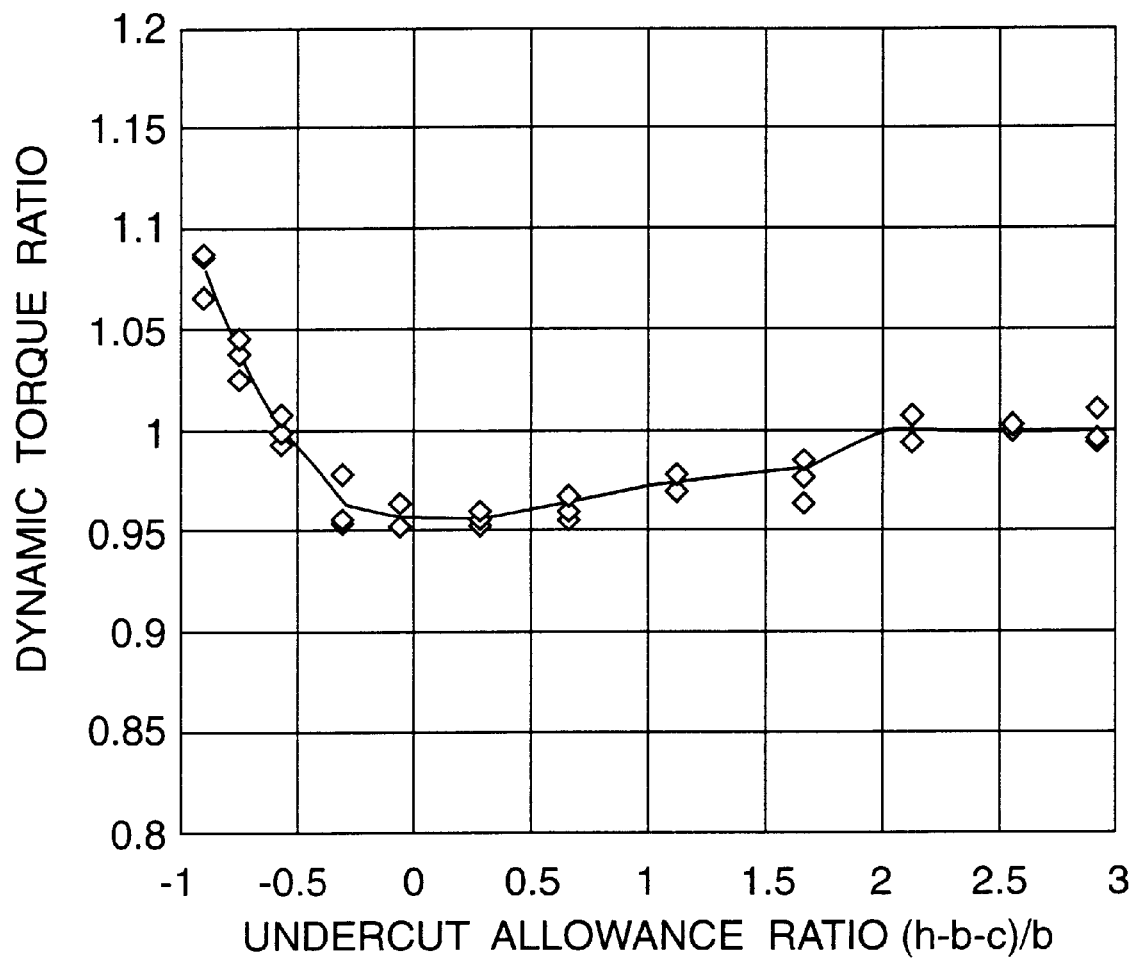
FIG. 5 is a graphical representation of the results ($F_a/C_{or}=0.035$) of a dynamic torque test conducted on bearings.
Figure 6:
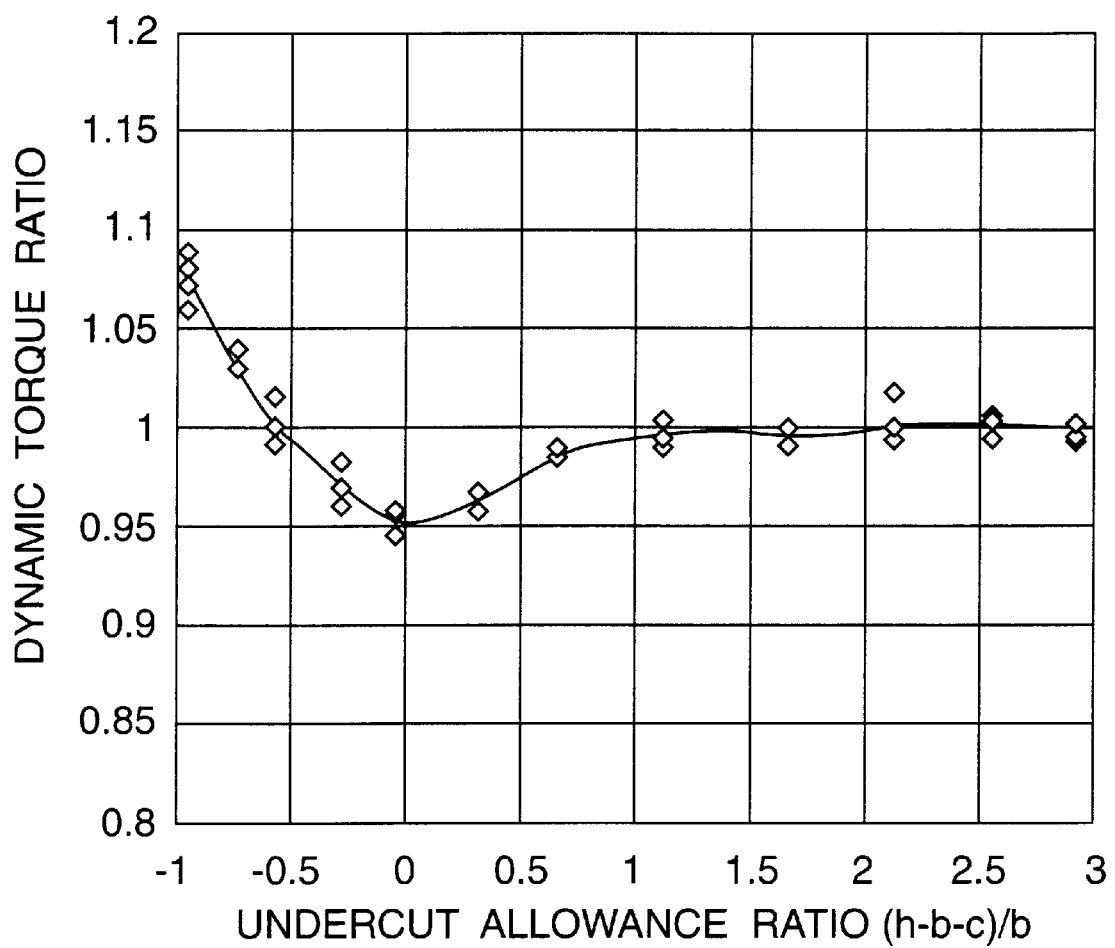
FIG. 6 is a graphical representation of the results ($F_a/C_{or}=0.106$) of a dynamic torque test conducted on bearings.
Figure 7:
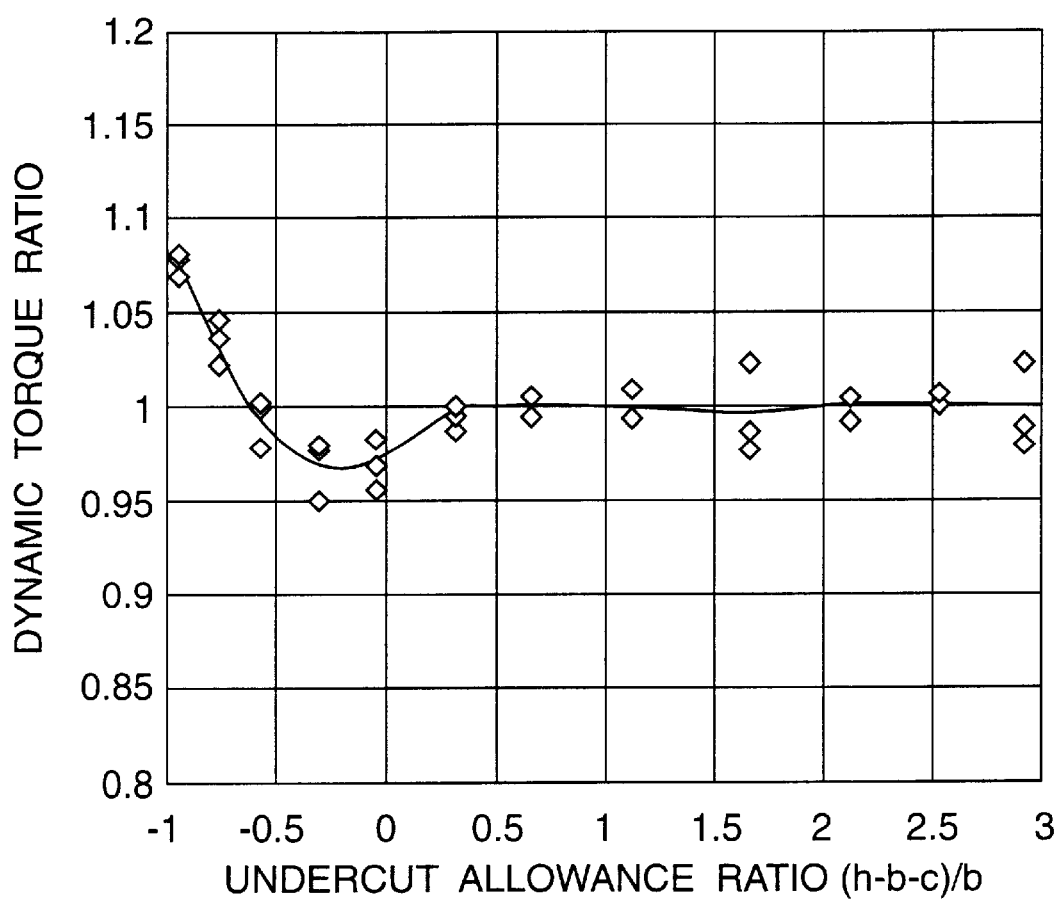
FIG. 7 is a graphical representation of the results ($F_a/C_{or}=0.179$) of a dynamic torque test conducted on bearings.

In FIGS. 5, 6 and 7, there are shown the results of the dynamic torque test conducted using tapered roller bearings different in the flange undercut (undercut dimension c). The horizontal axis represents the undercut allowance ratios (h-b-c)/b, and the vertical axis represents the dynamic torque ratios that are obtained when the mean value of the bearings respectively having undercut allowance ratios of more than 2 is used as the standard.

From FIGS. 5, 6 and 7, it is found that, in the case of (h-b-c)/b<-0.6, the dynamic torque increases. Therefore, it can be seen that a range capable of preventing the low torque property of the bearing from lowering must satisfy -0.6≦(h-b-c)/b.

From FIG. 5, it can be seen that the low torque property is enhanced in the range of -0.6≦(h-b-c)/b≦2. From FIG. 6, it can be seen that the low torque property is enhanced in the range of -0.6≦(h-b-c)/b≦1. Further, from FIG. 7, it can be seen that the low torque property is enhanced in the range of -0.6≦(h-b-c)/b≦0.

Figure 8:
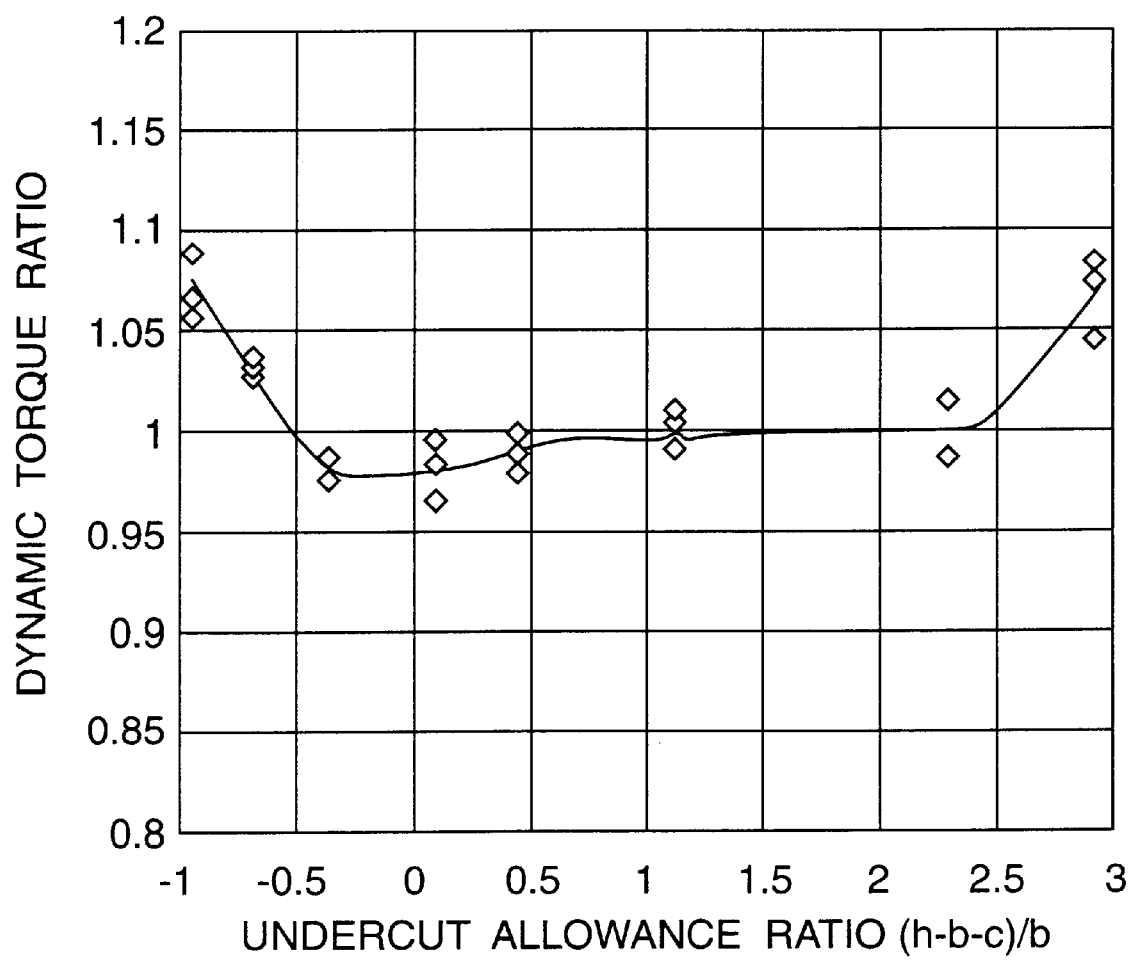
FIG. 8 is a graphical representation of the results (when a contact point height h is varied) of a dynamic torque test conducted on bearings.

Also, in FIG. 8, there are shown the results of the dynamic torque test conducted using tapered roller bearings respectively differing in the contact height h (the undercut dimension c is constant). The test conditions were that the temperature was 50° C., the quantity of lubricating oil was 500 ml/min., the axial load was constant ($F_a/C_{or}$=0.106), and the rotation number was constant. The horizontal axis shows the undercut allowance ratios (h-b-c)/b, and the vertical axis shows the dynamic torque ratios that are obtained when the result of the bearing used in FIGS. 5, 6 and 7 and having (h-b-c)/b≈2.3 is used as the standard.

From FIG. 8, it is found that the dynamic torque is lowered in the case of -0.6≦(h-b-c)/b but is increased in the case of 2.5<(h-b-c)/b. This is because, in case where the contact point height increases excessively, a torque component caused by the sliding friction of the contact point increases to thereby increase the dynamic torque. Therefore, it can be seen that a range capable of preventing the low torque property of the bearing from lowering must satisfy -0.6≦(h-b-c)/b≦2.5.

(3) Workability of Flange Undercut

In case where the flange undercut (undercut dimension c) can be worked small down to the limit, it is possible to increase the upper limit of (h-b-c)/b but to work the flange undercut (undercut dimension c) small, as has been described in the description of the related art, is limited.

The undercut dimension c that can be obtained without lowering the cost and productivity at the current technical level is of the order of 0.3–1.0 mm. Although this dimension increases a little as the size of the bearing increases, this dimension falls almost within the above range. On the other hand, in the case of the bearing size, as the diameter of the bearing increases, the contact point height h increases and thus (h-b-c)/b shows a rising tendency up to 5 or so. By the way, in the case of a bearing having a small size, since the flange undercut is set smaller than the above-mentioned optimum dimension of 0.3 in order to avoid interference by the contact ellipse and also since, even when the flange undercut varies in size and the distance between the end of the contact ellipse and the flange undercut is small, there is selected such a tolerance that can prevent mutual interference between the end of the contact ellipse and the flange undercut, most of the bearings that are actually produced, as has been described hereinbefore, have (h-b-c)/b of more than 2, while the value of (h-b-c)/b of the currently used conventional bearings falls within the range of 2–5.

On the other hand, according to the invention, by reducing the value of (h-b-c)/b to thereby shift the dimension in a direction where the flange undercut interferes with the contact ellipse positively, the seizure resistant property of the bearing can be enhanced due to the holding or storing effect of the lubricating oil. In case where the flange undercut may interfere with the contact ellipse, there is eliminated the need to reduce the size of the flange undercut more smaller than necessary, which makes it possible to select the undercut dimension that is suitable for working.

By the way, the present invention, of course, is not limited to the above-mentioned embodiments according to the invention and the illustrated embodiment of the invention, but various changes and modifications are possible. For example, the description has been given using the tapered roller bearing as an example. However, the invention is not limited to this but can also be applied to all kinds of roller bearings with a flange portion such as a cylindrical roller bearing and a spherical roller bearing.

Also, in the above-mentioned embodiments of the invention, the optimum undercut dimension of the flange portion is calculated on the basis of the data that have been obtained by conducting the test on the bearings of one kind of size. However, from the viewpoint of the mechanism of the seizure and torque of the bearing, the range of the undercut allowance ratios -0.6≦(h-b-c)/b≦2, which is suitable for the exhaustion of the lubricating oil and the low torque of the bearing, can be applied to bearings of all kinds of sizes. That is, in bearings of all kinds of sizes, this range can provide the effective holding or storing of the lubricating oil and can realize the optimum relation between the contact ellipse and flange portion.

As has been described heretofore, according to the invention, since the undercut allowance ratio of the contact ellipse is set in the above-mentioned range and there is obtained the optimum range of the undercut dimension of the flange portion, the undercut dimension of the flange portion can be increased to a certain degree without lowering the seizure resistant property or low torque property of the bearing. That is, by optimizing the undercut dimension in this manner, not only the performance of the bearing can be enhanced but also the workability of the undercut groove of the flange portion is enhanced to thereby be able to reduce the cost of the bearing.

Also, even when the load condition is unknown, by using the above-mentioned equations (1)–(14), all of the undercut allowance ratios can be easily calculated from the internal factors of the bearing. That is, by measuring the internal dimensions of the components of the bearing, the undercut allowance ratios can be all calculated.

What is claimed is:

1. A roller bearing comprising:
   an inner ring having a raceway surface;
   an outer ring having a raceway surface;
   a plurality of rollers rotatably interposed between the raceway surfaces of said inner and outer rings;
   wherein at least one of said inner and outer rings has a flange portion at at least one of its both side portions between which said raceway surface is interposed in an axial direction of said roller bearing, and a grinding undercut is formed between said flange portion and said raceway surface,
   wherein a contact ellipse is defined by mutual contact between said flange portion and the end face of said roller, and wherein an undercut allowance ratio of said contact ellipse is set in the range of $-0.6 \leq (h-b-c)/b \leq 2$, where $(h-b-c)/b$ expressing the undercut allowance ratio, c expressing a grinding undercut dimension on said flange portion side, h expressing a contact point height between said flange portion and the end face of said roller, and b expressing the minor radius of said contact ellipse.

2. A roller bearing according to claim 1, wherein the undercut allowance ratio of said contact ellipse is set in the range of $-0.6 \leq (h-b-c)/b \leq 1$.

3. A roller bearing according to claim 1, wherein the undercut allowance ratio of said contact ellipse is set in the range of $-0.6 \leq (h-b-c)/b \leq 0$.

4. A roller bearing comprising:

an inner ring having a raceway surface;

an outer ring having a raceway surface;

a plurality of rollers rotatably interposed between the raceway surfaces of said inner and outer rings;

wherein at least one of said inner and outer rings has a flange portion at at least one of its both side portions between which said raceway surface is interposed in an axial direction of said roller bearing, and a grinding undercut is formed between said flange portion and said raceway surface, wherein a contact ellipse is defined by mutual contact between said flange portion and the end face of said roller, and wherein an undercut allowance ratio of said contact ellipse is set in the range of $-0.6 \leq (h-b-c)/b \leq 2$, where $(h-b-c)/b$ expressing the undercut allowance ratio, c expressing a grinding undercut dimension on said flange portion side, h expressing a contact point height between said flange portion and the end face of said roller, and b expressing the minor radius of said contact ellipse; and a plurality of holes which extend in a radial direction of said bearing and are formed in said grinding undercut.

5. A roller bearing according to claim 4, wherein further comprising:

a lubricating oil containing member filled in at least one of said holes.

6. A roller bearing according to claim 5, wherein said lubricating oil containing member is an oil-containing porous material or resin.

7. A roller bearing comprising:

an inner ring having a raceway surface;

an outer ring having a raceway surface;

a plurality of rollers rotatably interposed between the raceway surfaces of said inner and outer rings;

wherein at least one of said inner and outer rings has a flange portion at at least one of its both side portions between which said raceway surface is interposed in an axial direction of said roller bearing, and a grinding undercut is formed between said flange portion and said raceway surface, wherein a contact ellipse is defined by mutual contact between said flange portion and the end face of said roller, and wherein an undercut allowance ratio of said contact ellipse is set in the range of $-0.6 \leq (h-b-c)/b \leq 2$, where $(h-b-c)/b$ expressing the undercut allowance ratio, c expressing a grinding undercut dimension on said flange portion side, h expressing a contact point height between said flange portion and the end face of said roller, and b expressing the minor radius of said contact ellipse, wherein the minor radius of the contact ellipse is a value which is defined by applying to said roller bearing a load which is substantially equal to 25% of a basic static load rating of said bearing.

8. A roller bearing according to claim 7, wherein the undercut allowance ratio of said contact ellipse is set in the range of $-0.6 \leq (h-b-c)/b \leq 1$.

9. A roller bearing according to claim 7, wherein the undercut allowance ratio of said contact ratio of said contact ellipse is set in the range of $-0.6 \leq (h-b-c)/b \leq 0$.

* * * * *